April 26, 1932.  A. C. HAMILTON  1,855,348
BRAKE ACTUATING MECHANISM
Filed July 14, 1927  2 Sheets-Sheet 1
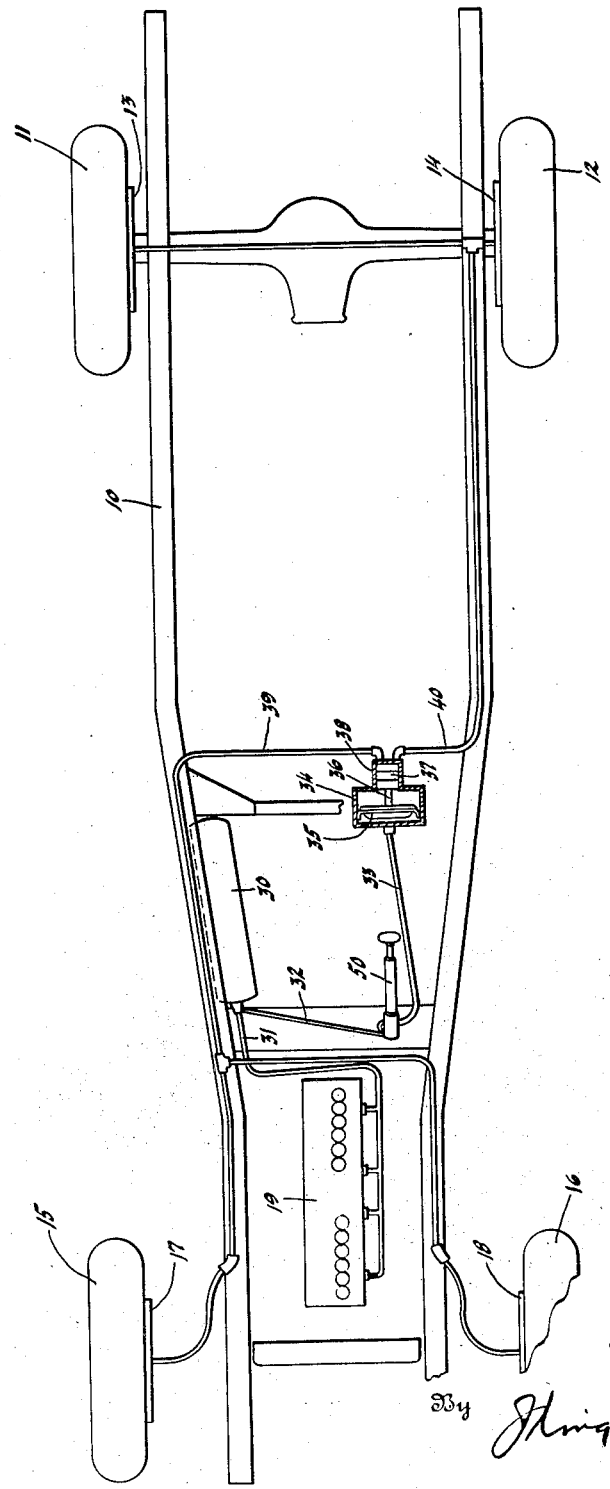

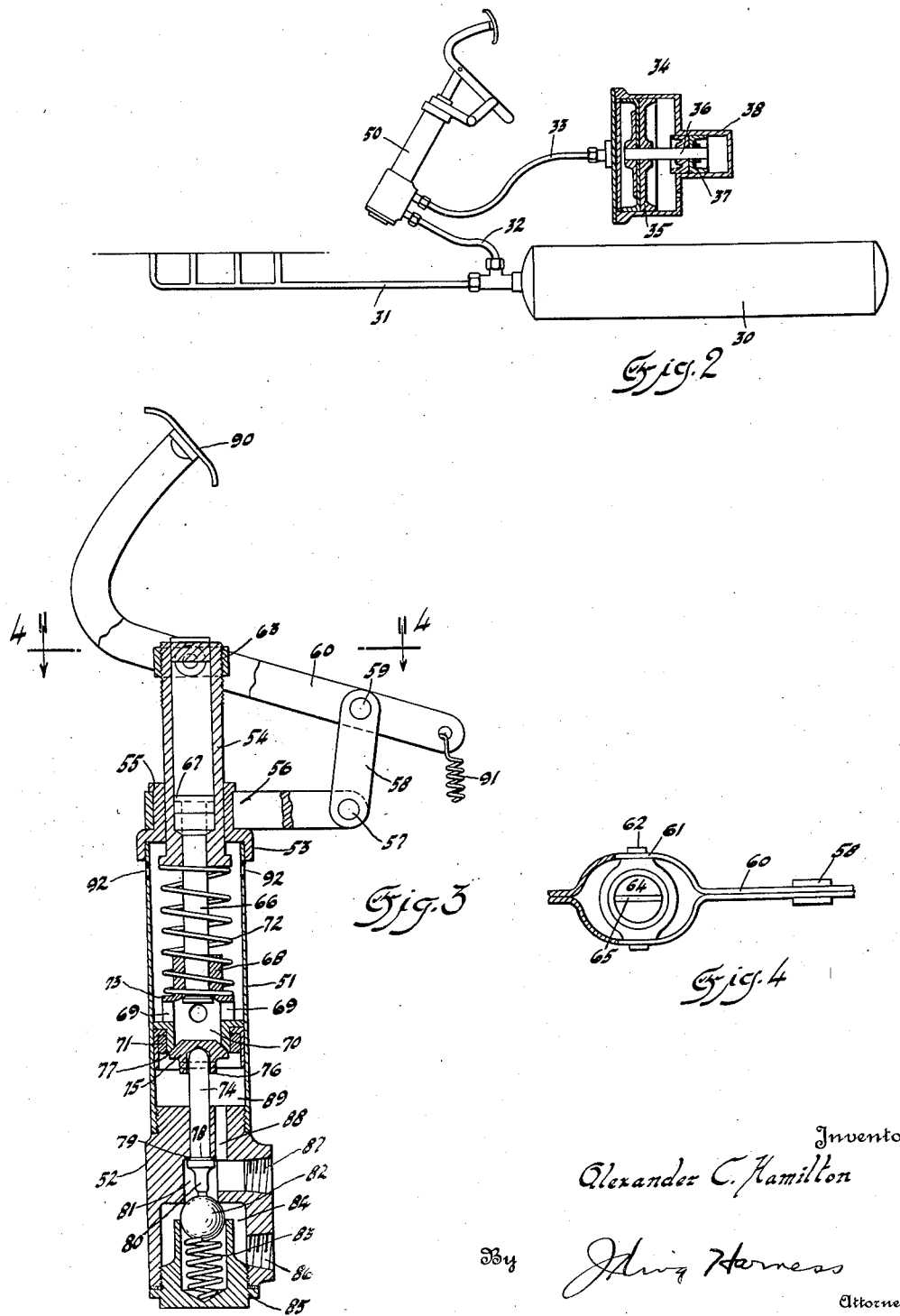

Patented Apr. 26, 1932

1,855,348

UNITED STATES PATENT OFFICE

ALEXANDER C. HAMILTON, OF DETROIT, MICHIGAN, ASSIGNOR TO W. LESTER MANGUM, OF DETROIT, MICHIGAN

BRAKE ACTUATING MECHANISM

Application filed July 14, 1927. Serial No. 205,612.

This invention relates to means for operating brakes on motor vehicles, and has for one of its objects the provision of simple and economical means for enabling the operator to apply the brakes smoothly with minimum efford thru the medium of air pressure.

With the above and other objects in view, my invention consists in the arrangement, combination and construction of the various parts of my improved device, as described in the specification, claimed in my claims and shown in the accompanying drawings in which:

Fig. 1 is a plan view of an automobile chassis diagrammatically showing the application of my device thereto.

Fig. 2 is an elevation showing the air valve, the air tank and, in section, the actuating pistons operated by means of the valve.

Fig. 3 is a sectional view of the air valve shown in Fig. 2 in balanced position with both inlet and exhaust valves closed.

Fig. 4 is a view taken on line 4—4 of Fig. 3.

I have shown an automobile chassis 10 having rear wheels 11 and 12 with brake drums 13 and 14 mounted on the inner sides thereof, front wheels 15 and 16 having brake drums 17 and 18 mounted on the inner sides thereof, and having an engine 19 mounted thereon.

Secured to one side of the chassis frame 10 is a tank 30 for holding compressed gases which are supplied thereto thru the pipe 31 which is suitably tapped into the exhaust of engine 19. A pipe 32 connects the tank 30 with the control valve 50 which in turn is connected by pipe 33 with cylinder 34 which contains slidable piston 35, and which in turn is connected by piston rod 36 with piston 37 in the small cylinder 38.

Leading from the end of cylinder 38 are pipes 39 and 40 which contain liquid and which may be conventionally connected with brake drums on the front and back wheels respectively.

The valve which has been generally referred to as 50 comprises a cylindrical sleeve 51 having secured in one end thereof a fitting member 52 and on the other end thereof a cap 53. A second sleeve 54 is inserted thru the cap 53 to a point within the sleeve 51. The exterior of the cap 53 is provided with a groove 55 to which may be secured one end of a supporting arm 56 the other end of which is secured as at 57 to the arm or lever 58. The arm or lever is pivotally connected at its other end as at 59 to the brake pedal 60 at a point adjacent the lower end of the pedal. The brake pedal 60 is secured as at 61 to the projections 62 on a collar 63 threaded on the sleeve 54. The sleeve 54 has a plug 64 fastened therein, said plug being provided with a transverse slot 65 so that the vertical position of the pedal 60 may be adjusted by inserting a screwdriver or other suitable instrument in the slot 65 and turning the plug 64 together with the sleeve 54 to move the collar 63 upwardly or downwardly on the sleeve 54.

Guided at one end within the sleeve 54 is a rod 66 having a head 67 threaded thereon which is slidable in sleeve 54 and having slidably secured on its lower end a piston member 68 provided with side air passages 69 and a central passage 70. A leather cup 71 is provided on the under side of the piston 68 so as to seal the same within the sleeve 51. A coil spring 72 extends between the lower end of the sleeve 54 and a flange 73 on the piston.

A rod 74 is positioned partially within the fitting 52 and partially within the sleeve 51, below the piston 68. The upper end of the rod 74 is of rounded formation and fits in the angular socket of the valve member 75. A slight clearance is provided between the rod 74 and the shank 76 of the valve member so that the valve may rock on the rod 74 to adjust itself on the seat 77 of the piston 68. A stop collar 78 is provided on the rod 74 and is adapted to seat as at 79 in the fitting 52. The projection 80 on the rod 74 extends into the passage 81 in the fitting 52 and is adapted to bear against a ball 82 which is normally resiliently pressed by the coil spring 83 to close the opening between passage 81 and passage 84. The coil spring 83 is mounted in the plug 85 which is threaded into the end of the fitting 52. An inlet opening 86 is provided in the fitting 52 for communicating with the pipe 32 so that compressed air may enter the passage 84 therethru.

An outlet opening 87 is provided in the fitting 52 communicating with the passage 81 so that when the valve 82 is off its seat air entering the opening 86 may proceed thru the passage 84, passage 81 and opening 87 into the pipe 33. A passage 88 is provided in the fitting 52 connecting the passage 81 with the space 89 between the piston 68 and the upper end of the fitting 52 so that when the valve 75 is off its seat air may pass thru the passage 70 of the piston and the passages 69 therein upwardly and to the atmosphere thru openings 92 in the sleeve 51.

In the practical operation of my improved device, pressure on the tread portion 90 of the foot pedal 60 will force the sleeve 54 downwardly, forcing the piston 68 downwardly thru the medium of the spring 72 until the valve member 75 comes to its seat. The valve 75 is not seated when the parts are in normal position. Further pressure will force the end 80 on the rod 74 to press downwardly on the ball 82 so as to permit air from the tank 30 to pass thru the pipe 32, opening 86, passages 84 and 81, opening 87 and pipe 33 to the cylinder 34 where it will force outwardly the piston 35, resulting in the outward movement of the piston 37 to move the fluid in the pipes 39 and 40 for actuating the brakes on the four wheels. If, for any reason, an excessive amount of air pressure is built up the piston 68 may be lifted against the pressure of the spring 72 to release a portion of the pressure. It will be apparent that lifting of the piston 68 will permit the valve 75 to be lifted even to the point of unseating the end 80 from the ball 82, in which event further entry of air will be prevented. The valve 75 may raise until the valve 78 comes to its seat 79 at which time either the piston 68 will come to a stop or the valve 75 will be unseated. When the pressure on the foot pedal has been released the return spring 91 will act to raise the same, together with the sleeve 54 and the spring 72, permitting the ball 82 to regain its seat so as to prevent further passage of air thru the passage 84 and unseating the valve 75 so as to open to the atmosphere space 89, passage 88, opening 87 and pipe 33 when the system is at rest.

It will be readily understood by those skilled in the art that the braking system proper insofar as the wheel construction and piping leading thereto may be of any conventional design. While I prefer the hydraulic system my invention is not necessarily limited thereto because it concerns itself primarily with the valve structure and master cylinder construction.

It will also be readily apparent that the excessive pedal pressures which are oftentimes developed on braking systems of various kinds will not be developed in my improved construction because it is only necessary for the operator to exert a pressure which will overcome the tension of the spring 72 and the spring 83, the actuating power being thereafter applied thru compressed air.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. In combination, a brake actuating control valve having a tubular piece adapted, when actuated, to operate the valve, a lever for actuating said piece, a member threaded around the piece and engaged with the lever, and means for turning the piece for adjusting the position of the lever relative thereto.

2. In combination, a brake actuating control valve having a tubular piece adapted, when actuated, to operate the valve, a lever for actuating said piece, a member threaded around the piece and engaged with the lever, and means for turning the piece for adjusting the position of the lever relative thereto, said means comprising a plug in the piece having a tool engageable portion accessible from one end of the piece.

3. In a valve organization of the class described; a casing provided with inlet, outlet and exhaust openings; a resiliently held valve for normally closing said inlet opening to said outlet opening; a piston slidable in said casing between said outlet and exhaust openings and having an exhaust port therethrough; a stem member slidable in said casing and supported by said inlet valve, and supporting a valve for closing the exhaust port in said piston; means for actuating said piston to operate said valves; and means to prevent direct impingement of incoming fluid against said piston during passage between said inlet and said outlet openings.

4. In a valve organization of the class described; a casing provided with inlet, outlet and exhaust openings; a resiliently held valve for normally closing said inlet opening to said outlet opening; a piston slidable in said casing between said outlet and exhaust openings and having an exhaust port therethrough; a stem member slidable in said casing and supported by said inlet valve, and supporting a valve for closing the exhaust port in said piston; means for actuating said piston to operate said valves; and means to deflect the force of incoming fluid from said piston during passage between said inlet and outlet openings.

5. In a valve organization of the class described; a casing provided with inlet, outlet and exhaust openings; a resiliently held valve for normally closing said inlet opening to said outlet opening; a piston slidable in said casing between said outlet and exhaust openings and having an exhaust port therethrough; a stem member slidable in said casing and supported by said inlet valve, and supporting a valve for closing the exhaust port in said piston; means for actuating said piston to operate said valves; and means to pass incoming fluid from said inlet opening to said outlet opening exteriorly of said piston chamber.

ALEXANDER C. HAMILTON.